United States Patent
Kammerer et al.

(10) Patent No.: US 10,868,423 B2
(45) Date of Patent: Dec. 15, 2020

(54) TRANSMISSION DEVICE FOR ENERGY TRANSMISSION BETWEEN MULTIPLE ELECTRICAL ENERGY NETWORKS

(71) Applicant: SIEMENS AKTIENGESELLSCHAFT, Munich (DE)

(72) Inventors: Felix Kammerer, Erlangen (DE); Martin Pieschel, Nuremberg (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 16/612,430

(22) PCT Filed: May 9, 2017

(86) PCT No.: PCT/EP2017/060997
§ 371 (c)(1),
(2) Date: Nov. 11, 2019

(87) PCT Pub. No.: WO2018/206083
PCT Pub. Date: Nov. 15, 2018

(65) Prior Publication Data
US 2020/0067310 A1 Feb. 27, 2020

(51) Int. Cl.
*H02J 3/06* (2006.01)
*H02J 3/18* (2006.01)
*H02M 7/219* (2006.01)

(52) U.S. Cl.
CPC ............... *H02J 3/06* (2013.01); *H02J 3/1857* (2013.01); *H02M 7/219* (2013.01)

(58) Field of Classification Search
CPC .......... H02J 3/06; H02J 3/1857; H02M 7/219; H02M 5/10; H02M 5/271; H02M 5/32; H02M 5/38; H02M 5/46
See application file for complete search history.

(56) References Cited

U.S. PATENT DOCUMENTS

| 10,333,310 B2 | 6/2019 | Hoerger et al. |
| 2005/0111246 A1* | 5/2005 | Lai .................. H02M 7/487 363/157 |

(Continued)

FOREIGN PATENT DOCUMENTS

| CN | 106532714 A | 3/2017 |
| DE | 102015220220 A1 | 4/2017 |

(Continued)

OTHER PUBLICATIONS

Holger Wrede; "Design of an Electronic Power Transformer"; pp. 1380-1385; 0-7803-7474-6/02 2002 IEEE (Year: 2002).*

(Continued)

*Primary Examiner* — Rexford N Barnie
*Assistant Examiner* — Joseph N Inge
(74) *Attorney, Agent, or Firm* — Laurence Greenberg; Werner Stemer; Ralph Locher

(57) ABSTRACT

A transmission device transmits energy between multiple electrical energy networks, each providing a multi-phase connection voltage at a network frequency for electrical energy supply. The transmission device contains multi-phase multi-stage rectifiers and a control device, which adjusts the transmission of energy into at least one energy-receiving energy network according to an input by controlling the multi-stage rectifiers. The multi-stage rectifiers are each connected to one of the energy networks and to one another via at least one multi-phase transformer. Electrical energy flows via the transformer at a predefined transmission frequency from at least one energy-emitting energy network into at least one energy-receiving energy network. The transmission frequency is, in particular, multiple times the network frequency.

6 Claims, 9 Drawing Sheets

(56) References Cited

U.S. PATENT DOCUMENTS

| | | | |
|---|---|---|---|
| 2006/0233000 A1* | 10/2006 | Akagi | H02M 3/33584 363/37 |
| 2008/0198637 A1* | 8/2008 | Meysenc | H02M 7/219 363/67 |
| 2010/0244575 A1* | 9/2010 | Coccia | H02M 7/49 307/82 |
| 2013/0107588 A1* | 5/2013 | Katayama | H02M 7/49 363/37 |
| 2013/0286704 A1* | 10/2013 | Liu | H02M 7/49 363/132 |
| 2014/0042817 A1* | 2/2014 | Zargari | H02M 1/32 307/72 |
| 2015/0340860 A1* | 11/2015 | Tenca | H02M 3/33576 307/31 |
| 2017/0005565 A1* | 1/2017 | Bai | H02M 7/219 |

FOREIGN PATENT DOCUMENTS

| | | |
|---|---|---|
| EP | 1657809 A1 | 5/2006 |
| EP | 2290799 A1 | 3/2011 |

OTHER PUBLICATIONS

Heinemann Lothar; "An Actively Cooled High Power, High Frequency Transformer with High Insulation Capability"; pp. 352-357 ; 0-7803-7404-5/02/$17.00 (c) 2002 IEEE (Year: 2002).*

Lothar Heinemann: "An actively cooled high power, high frequency transformer with high insulation capability", APEC 2002. 17th. Annual IEEE Applied Power Electronics Conference and Exposition. Dallas, TX, Mar. 10-14, 2002; Annual Applied Power Electronics Conference, New York, NY : IEEE, US, Bd. Conf. 17, pp. 352-357, XP010582944, DOI: 10.1109/APEC.2002.989270; ISBN: 978-0-7803-7404-1; pp. 352-354; fig 1, 2; 2002.

Holger Wrede; "Design of an Electronic Power Transformer"; pp. 1380-1385; 0-7803-7474-6/02 2002 IEEE.

A. C, Franklin; "Voltage variation by tap changing"; D.P.:The J&P Transformer Book; 11th Edition, Kapitel 1983; p. 279; 1983.

* cited by examiner

TRANSMISSION DEVICE FOR ENERGY TRANSMISSION BETWEEN MULTIPLE ELECTRICAL ENERGY NETWORKS

BACKGROUND OF THE INVENTION

Field of the Invention

The invention relates to a transmission device for energy transmission between multiple electrical energy networks in accordance with the preamble of the independent claim.

A known method for energy transfer between two electrical three-phase networks uses a (variable AC) transformer as a passive transmission device, by means of which the two three-phase networks are connected to each other in an electrically isolated manner.

The disadvantage of this method is that no dynamic control of the power flows is possible. Added to this is the large material requirement and the fact that substantial losses occur in idle mode. Also, no coupling of asynchronous networks is possible.

Transformers are known that have a DC link circuit, which controls the power flow by means of high-frequency transformers and couples asynchronous three-phase networks in an electrically isolated manner. The disadvantage of this type of control of the power flow is that at least one DC link is necessary in order to avoid the loads associated with a strong increase in voltage. The DC link in this case has a large number of power semiconductors, which in turn significantly increases the probability of failure. A further disadvantage is the inability to use this system as a combined longitudinal and transverse controller (see "The J&P Transformer Book" by A. C. Franklin and D. P. Franklin, 1983, 11th edition, chapter "Voltage variation by tap changing", page 279).

SUMMARY OF THE INVENTION

The object of the invention is to propose a transmission device without a DC link for multi-phase energy networks (three-phase networks), in which the energy networks are coupled in an electrically isolated manner and dynamic control of the power flows is possible.

The object is achieved by the features of the independent claim 1; the sub-claims represent advantageous embodiments.

The proposed solution is a transmission device which has multi-phase multilevel power converters which are each connected to one of the energy networks (at their supply connections) and connected to one another via a first multi-phase transformer and therefore electrically isolated from each other, via which at a specified transmission frequency electrical energy flows from at least one energy-supplying energy network into at least one energy-consuming energy network for at least part of the time, wherein the transmission frequency is greater than any of the network frequencies. Further, the transmission device has a control device (control unit), which by controlling the multilevel power converters adjusts the energy transfer into the at least one energy-consuming energy network according to a setpoint value.

Advantageously, the multi-phase energy networks are three-phase or two-phase networks and the multilevel power converters have either three or two phase connections corresponding thereto to the respective network (on the network side).

In one advantageous embodiment the transformer has two connection sides (e.g. a primary side and a secondary side) and is designed as either three-phase or two-phase on both connection sides. Alternatively, the transformer is designed as three-phase on one connection side and as two-phase on the other connection side. The multilevel power converters then have three or two phase connections on the transformer side, corresponding to the connection sides of the transformer in each case.

In a further advantageous embodiment the transformer has a three-phase connection side and three two-phase connection sides, wherein on each of the two-phase connection sides a multilevel power converter is connected to two phase connections on the transformer side.

Alternatively, a multilevel power converter is advantageously connected via the first transformer to a second multilevel power converter and (at the same time, quasi-parallel) via a second transformer to a third multilevel power converter, wherein the second and third multilevel power converter are connected to each other via the first and second transformer.

In order to achieve dynamic control of the power flows, each multilevel power converter for each phase is formed of two series-connected power converter modules, wherein the electrical connections between the power converter modules form the network-side phase connections that are connected to the energy network.

In this arrangement, each power converter module is formed of a plurality of series-connected sub-modules and an inductance, which have semiconductor switches controlled by the control unit (control device), which are implemented in a full-bridge circuit.

In order to adjust the power flows and the (energy) flow dynamically, i.e. the electrical energy to be transmitted per unit time, by the control device, the electric current is detected by the multilevel power converters and the connection of the supply voltages (at the supply connections) of the energy networks.

BRIEF DESCRIPTION OF THE SEVERAL VIEWS OF THE DRAWING

The invention is described hereafter by reference to an exemplary embodiment. Shown are.

DESCRIPTION OF THE INVENTION

Figure 1:
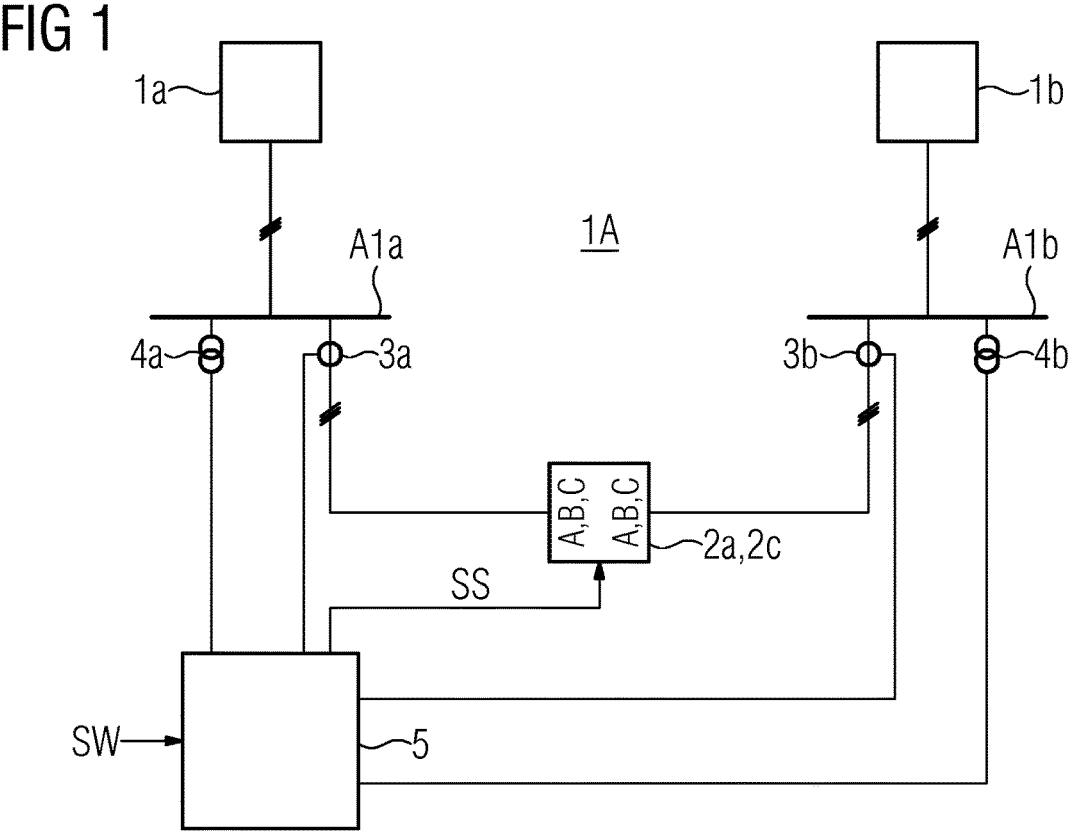
FIG. 1 a first arrangement having two three-phase electrical energy networks, which are coupled via a transmission device, FIG. 2 a second arrangement having three three-phase energy networks, which are coupled via a common transmission device, FIG. 3 a third arrangement of two three-phase energy networks having a transmission line connected between the two energy networks, FIG. 4 a fourth arrangement of three three-phase energy networks having two transmission lines connected between the energy networks, FIG. 5 a fifth arrangement of two three-phase energy networks having a transmission line connected between the two energy networks, FIG. 6 a first embodiment of the transmission device of the first and third arrangement, FIG. 7 a second embodiment of the transmission device of the first and third arrangement, FIG. 8 a third embodiment of the transmission device of the second and fourth arrangement, FIG. 9 a fourth embodiment of the transmission device of the second and fourth arrangement, FIG. 10 a fifth embodiment of the transmission device of the fifth arrangement, which has four multilevel converters, FIG. 11 a multilevel power converter with three network-side and two transformer-side phase connections, FIG. 12 a multilevel power converter with three network-side and two transformer-side phase connections, FIG. 13 a multilevel power converter with two network-side and two transformer-side phase connections, FIG. 14 a converter module having a plurality of series-connected sub-modules, FIG. 15 a sub-module with a power module, a DC link and a capacitor module, FIG. 16 the structure of the power module and FIG. 17 the structure of the capacitor module.

FIG. 1 shows a first arrangement 1A having two three-phase electrical energy networks (energy supply networks) 1a and 1b, which are three-phase networks, each with a fixed network frequency. For the electrical energy supply the energy networks 1a, 1b provide a three-phase supply voltage at supply terminals, which are implemented as supply busbars A1a, A1b.

The two energy networks 1a, 1b are coupled via a transmission device 2a, 2c (also known as an electronic transformer), which are each connected to one of the energy networks 1a, 1b (to their supply busbars A1a, A1b).

By means of voltage sensors 4a, 4b (which here are embodied as measurement transformers), the supply voltages applied to the supply busbars A1a, A1b (AC supply voltages) are measured. In addition, current sensors 3a, 3b measure the electric currents flowing into and out of the energy networks 1a and 1b via the transmission device 2a, 2c. The current measurements 3a, 3b and the voltage measurements 4a, 4b are processed by a common control device 5, which adjusts the energy transfer from the energy-supplying energy network 1a or 1b into the energy-consuming energy network 1b or 1a on the basis of a setpoint value SW and the measurements of the sensors 3a, 3b, 4a, 4b. The setpoint value SW relates to both the active and/or reactive power to be transferred between the energy networks 1a, 1b.

The control device 5 calculates control signals SS in each case, which are transferred to the transmission device 2a, 2c. By means of the control signals SS, the transmission device 2a, 2c is controlled in such a way that the desired energy transmission is realized in each case. In this way the control device 5 monitors and controls the transmission device 2a, 2c.

Figure 2:
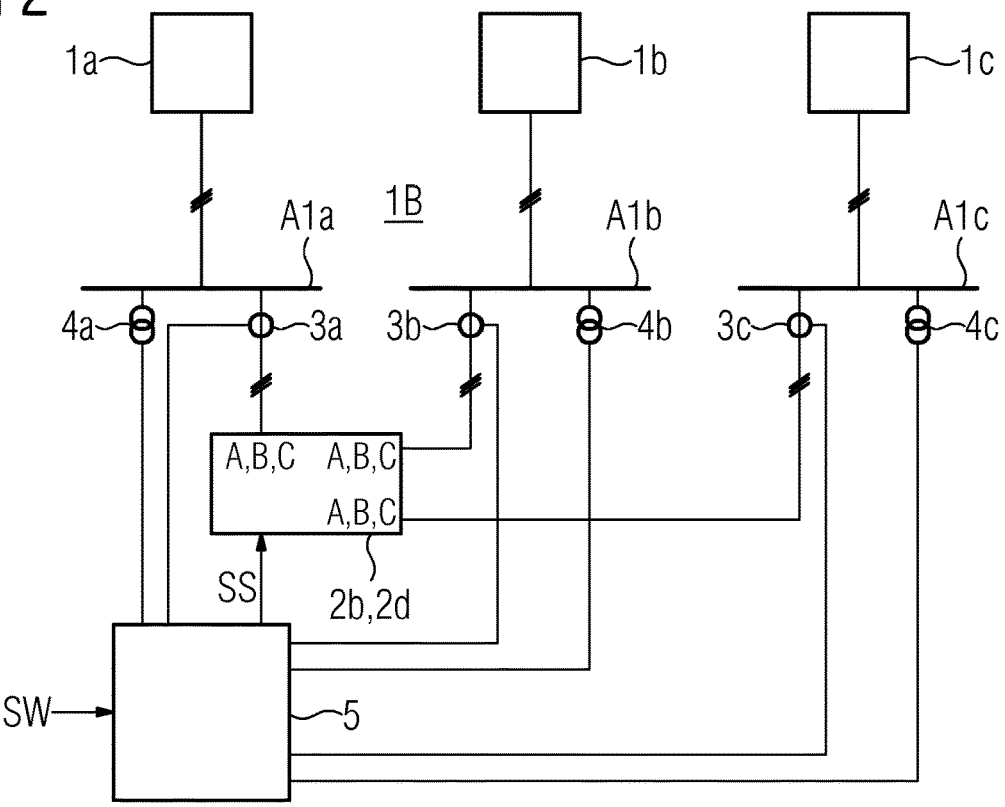

FIG. 2 shows a second arrangement 1B, which in contrast to the first arrangement 1A has three electrical energy networks 1a, 1b, 1c, each of which provides a three-phase supply voltage (on supply busbars A1a, A1b, A1c) for the electrical power supply.

As shown in FIG. 1 the three energy networks 1a, 1b, 1c are coupled via a common transmission device 2b, 2d to a plurality of output circuits. On the basis of the measurements of the sensors 3a, 3b, 3c and 4a, 4b, 4c, and the setpoint values SW the control device 5 calculates corresponding control signals SS and outputs them to the transmission device 2b, 2d to control the energy transmission.

Figure 3:
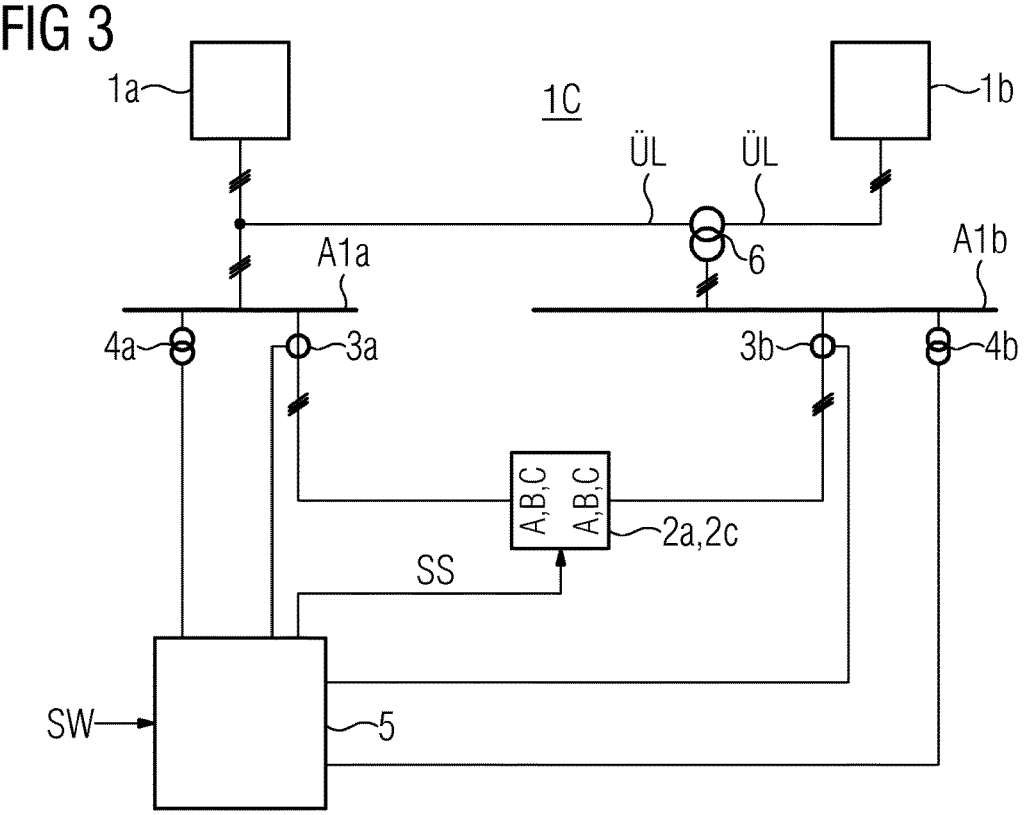

FIG. 3 shows a third arrangement 1C, which similarly to the first arrangement 1A has two three-phase energy networks 1a and 1b, wherein in contrast to the first arrangement 1A on a transmission line UL between the two energy networks 1a and 1b, the transmission device 2a, 2c is connected in series between the two energy networks 1a and 1b via a transformer 6. This is equivalent to a Unified Power Flow Controller (UPFC).

Figure 4:
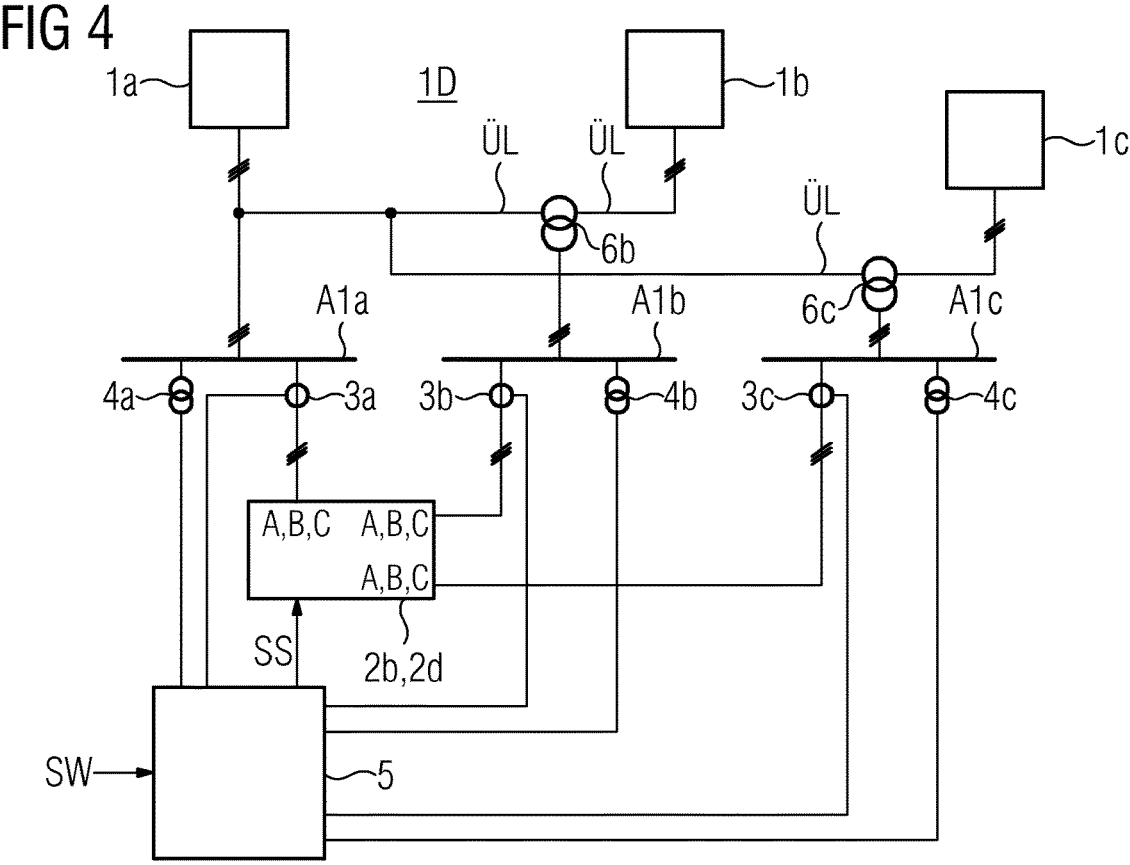

FIG. 4 shows a fourth arrangement 1D, which similarly to the second arrangement 1B has three three-phase electrical energy networks 1a, 1b, 1c, wherein in contrast to the second arrangement 1B, on a transmission line between the three energy networks 1a, 1b and 1c, the common transmission device 2b, 2d with multiple output circuits is connected in series between the energy networks 1a, 1b, 1c via a second and third transformer 6b and 6c. This is equivalent to a Unified Power Flow Controller (UPFC) for multiple output circuits.

Figure 5:
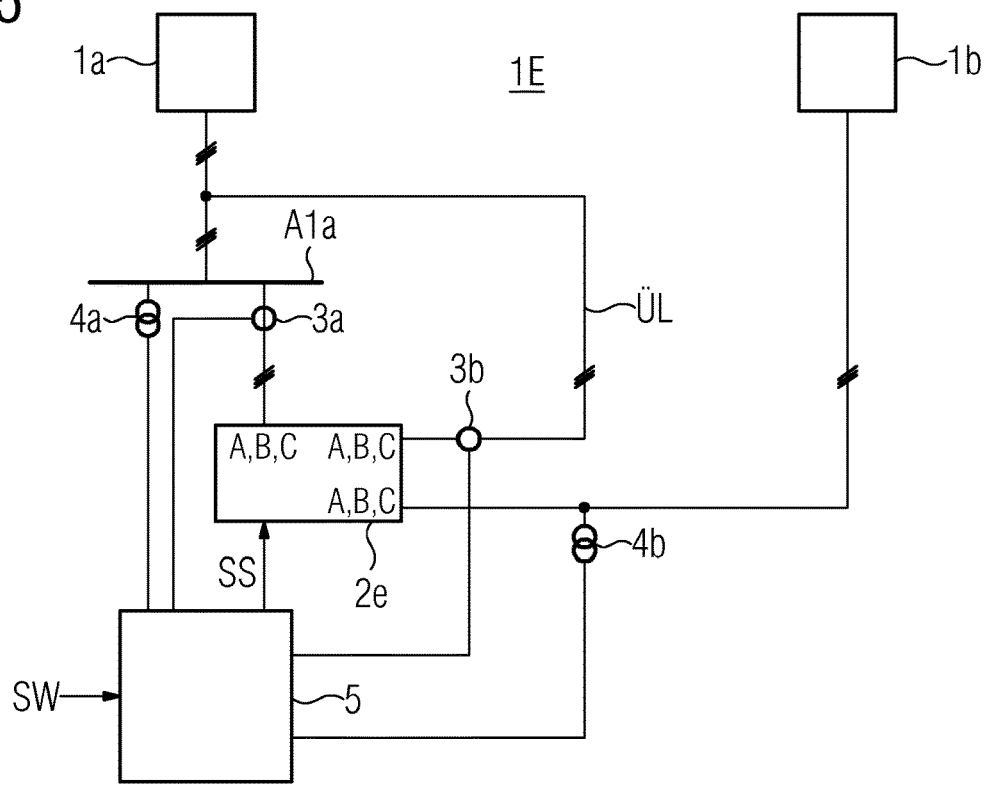
Figure 10:
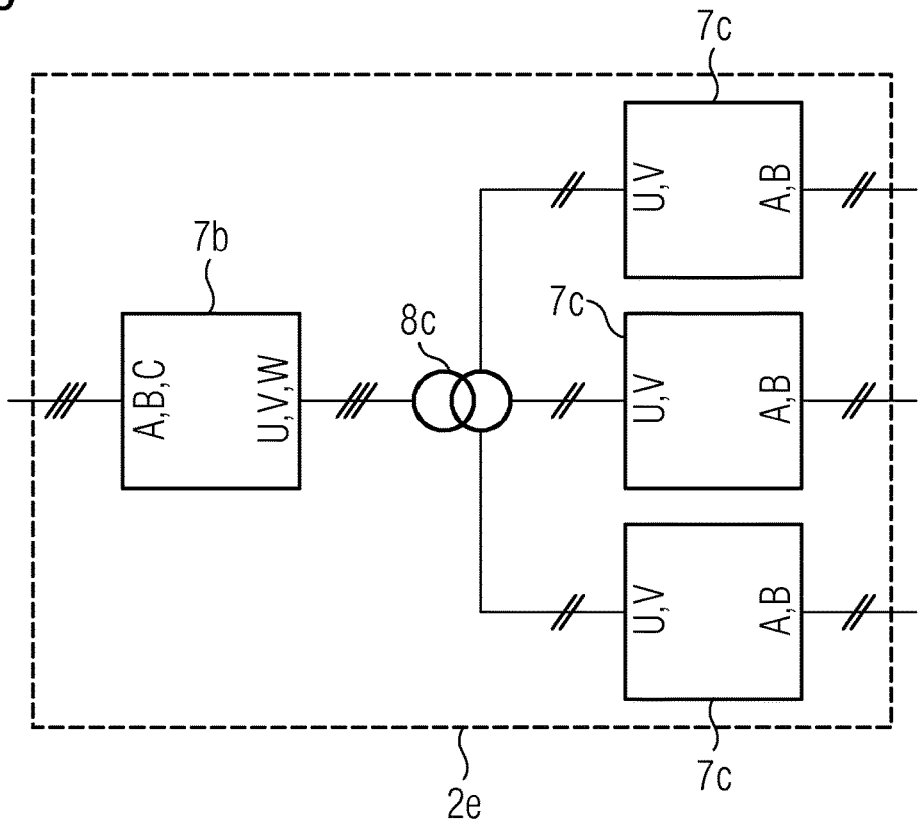

FIG. 5 shows a fifth arrangement 1E, which similarly to the first arrangement 1A has two three-phase electrical energy networks 1a, 1b, wherein in contrast to the first arrangement 1A, the transmission device 2e is connected on a transmission line UL in series between the two energy networks 1a, 1b without an additional transformer (see FIG. 10). This is also equivalent to a Unified Power Flow Controller (UPFC).

Figure 6:
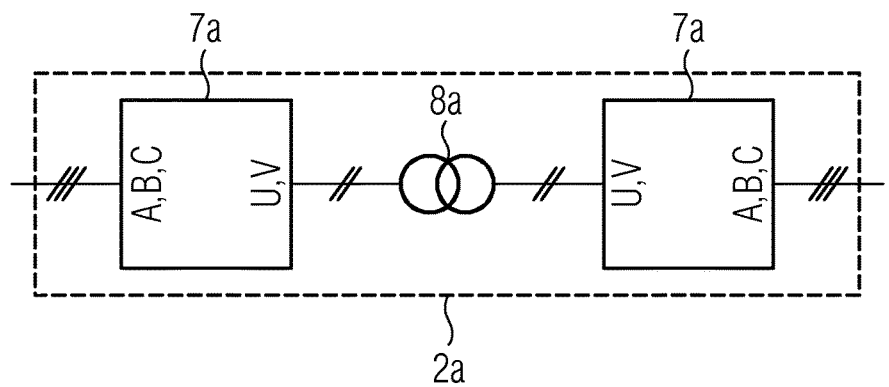

FIG. 6 shows a first embodiment of the transmission device 2a of the first and third arrangement 1A, 1C, which has two multilevel power converters 7a which are coupled via a transformer 8a, which is designed to be two-phase on both connection sides (the connection sides of the transformer are also referred to as its primary side and secondary side). Corresponding to these, the multi-phase multilevel power converters 7a have three phase connections A, B, C each on the network side and two-phase connections U and V each on the transformer side.

Figure 7:
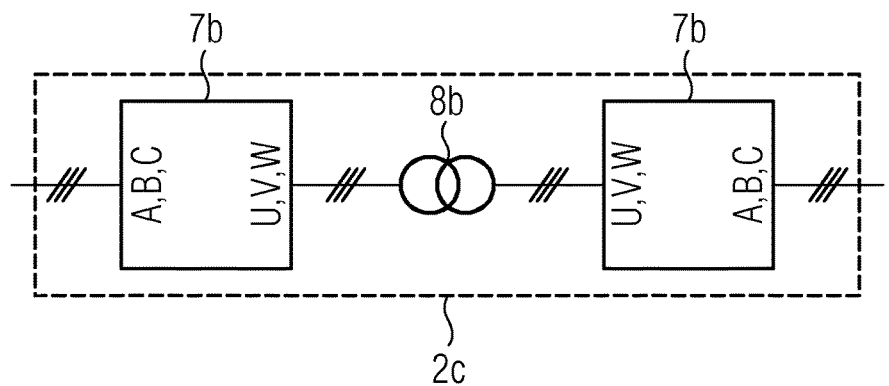

FIG. 7 shows a second design of the transmission device 2a, 2c in the first and third arrangement 1A, 1C, which has two multilevel power converters 7b, which in contrast to the first design according to FIG. 6 are coupled on both connection sides via a three-phase transformer 8b. Corresponding to these, the multilevel power converters 7a have three phase connections U, V, W each on the transformer side.

Figure 8:
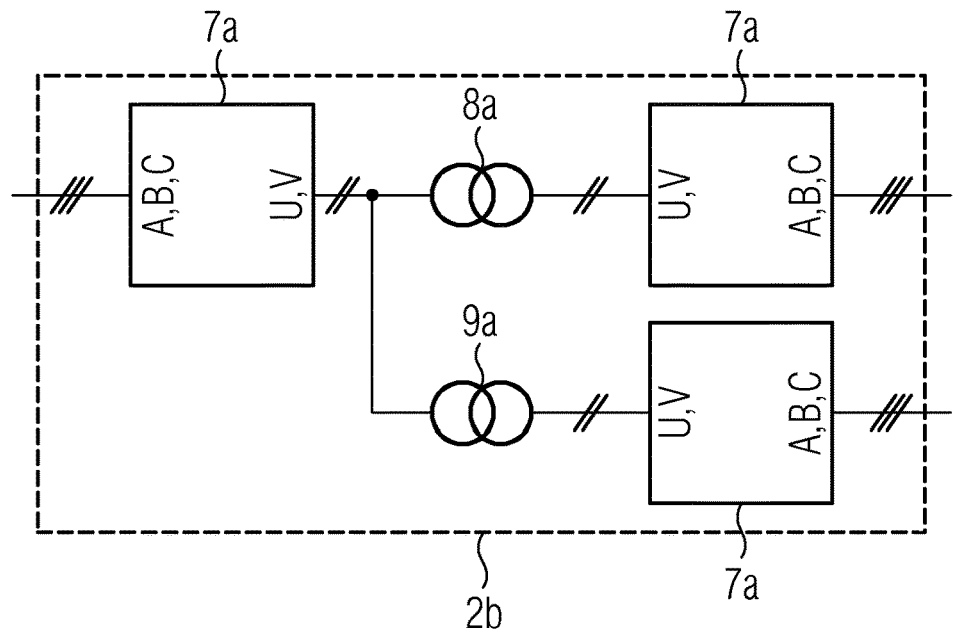

FIG. 8 shows a third design of the transmission device 2b of the second and fourth arrangement 1B, 1D, which has three multilevel power converters 7a (a first, second and third multilevel power converter 7a), which are coupled via two transformers 8a (a first transformer 8a (in FIG. 8, top) and a second transformer 8a (in FIG. 8, bottom)), which are designed as two-phase on both connection sides. Corresponding to this, the multi-phase multilevel power converters 7a each have two phase connections U and V on the transformer side. The second and third multilevel power converters 7a are connected to each other via the first and second transformer 8a.

Figure 9:
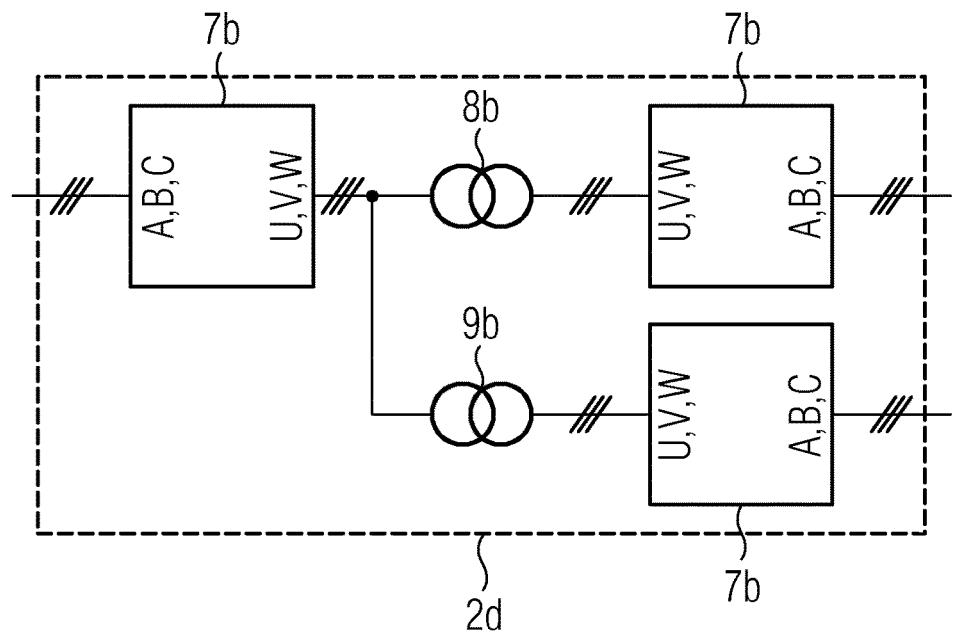

FIG. 9 shows a fourth design of the transmission device 2d of the second and fourth arrangement 1B, 1D, in which in contrast to FIG. 8 the two transformers 8b (the first transformer 8b (in FIG. 9, top) and the second transformer 8b (in FIG. 9, bottom)) are each designed as three-phase on both connection sides.

FIG. 10 shows a fifth design of the transmission device 2e of the fifth arrangement 1E, which has four multilevel power converters 7b, 7c (a first multilevel power converter 7b and a second, third and fourth multilevel power converter 7c), which are coupled via a transformer 8c which is designed as three-phase on one connection side and three times two-phase on the other side (i.e. it has three two-phase transformer connections). Correspondingly, the first multilevel power converter 7b has three phase connections U, V, W on the transformer side; the second, third and fourth multilevel power converters 7c therefore each have two phase connections U, V on the transformer side.

Figure 11:
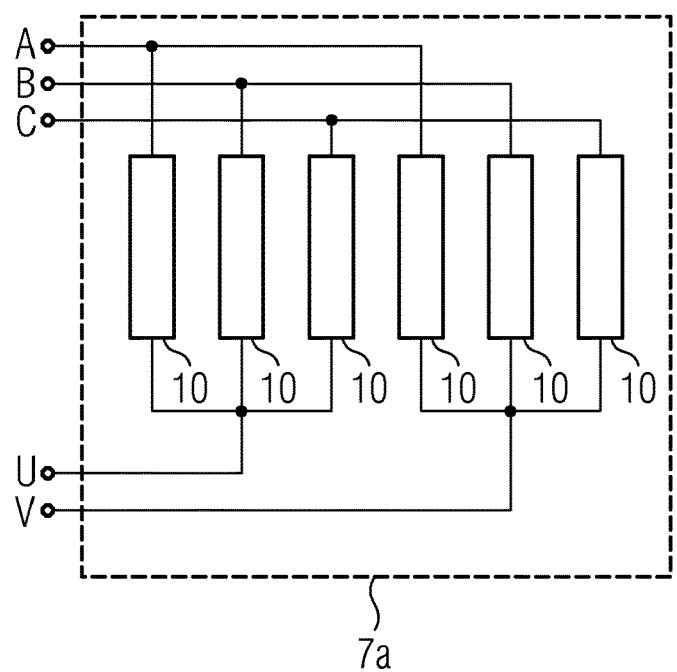

FIG. 11 shows a multilevel power converter 7a with three network-side phase connections A, B, C on one phase connection side and two transformer-side phase connections U, V on the other phase connection side. Further, the multilevel power converter 7a comprises six power converter modules 10, wherein for each phase two power converter modules 10 are connected in series. The electrical connections between the power converter modules 10 form the network-side phase connections A, B, C.

Figure 12:
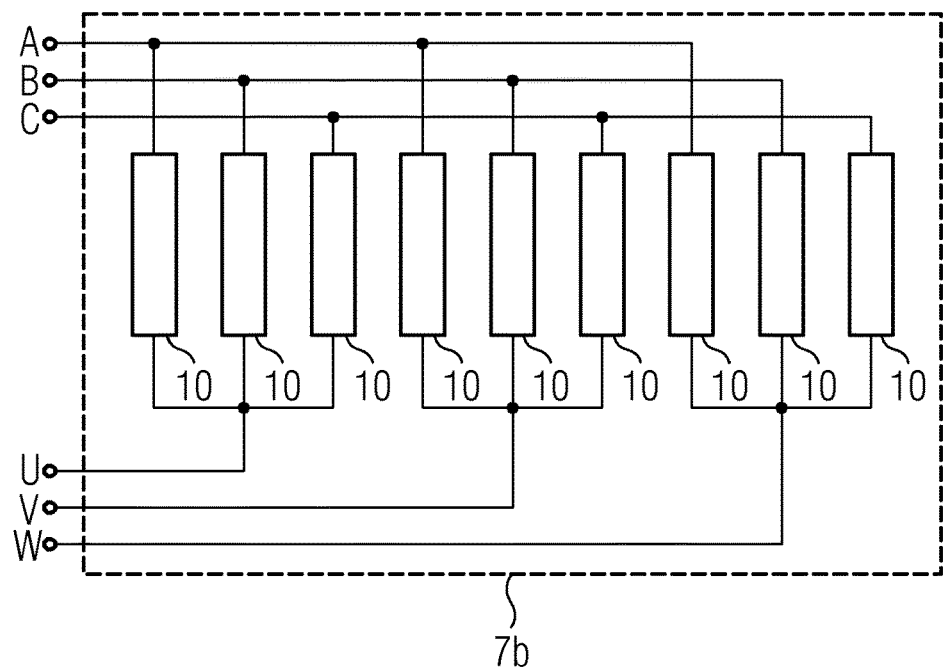

FIG. 12 shows a multilevel power converter 7b with three network-side phase connections A, B, C on one phase connection side and three transformer-side phase connections U, V, W on the other phase connection side. Therefore, the multilevel power converter 7b comprises nine power converter modules 10.

Figure 13:
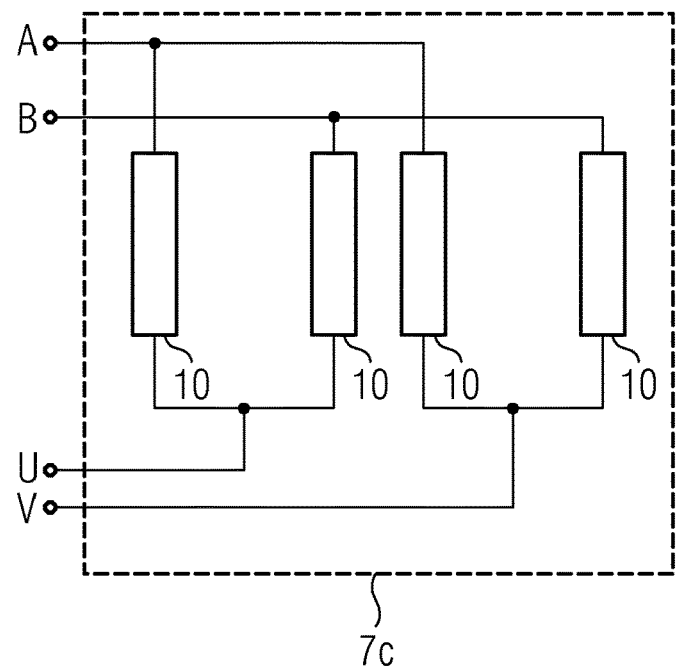

FIG. 13 shows a multilevel power converter 7c with two network-side phase connections A, B on one phase connection side and two transformer-side phase connections U, V on the other phase connection side. Therefore, the multilevel power converter 7c comprises four power converter modules 10.

Figure 14:
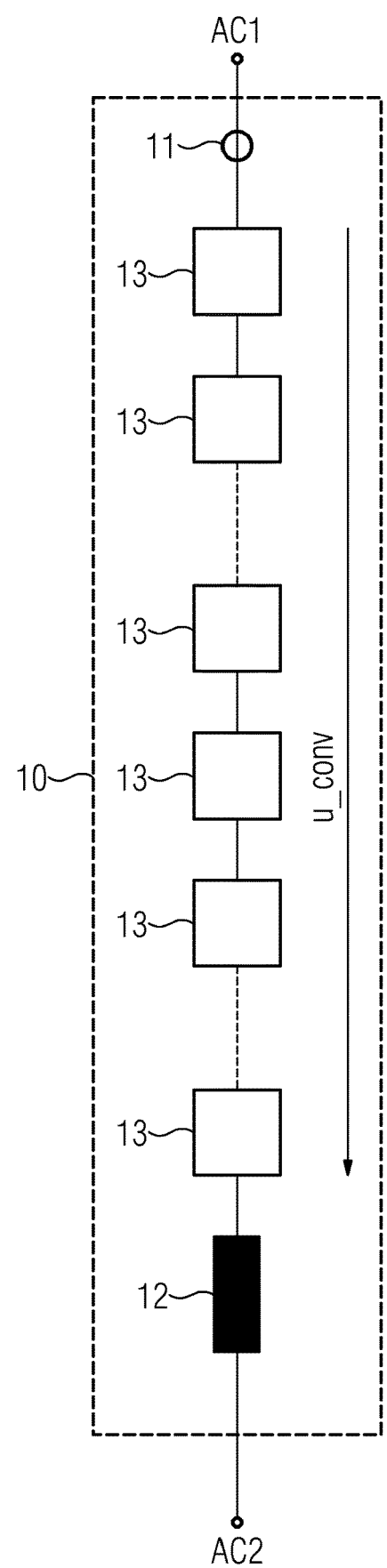

FIG. 14 shows a power converter module 10 (with AC voltage connections AC1 and AC2), which is formed by an inductance 12 and a plurality of sub-modules 13 connected in series. The current through the power converter module 10 is measured by means of a current sensor 11.

Figure 15:
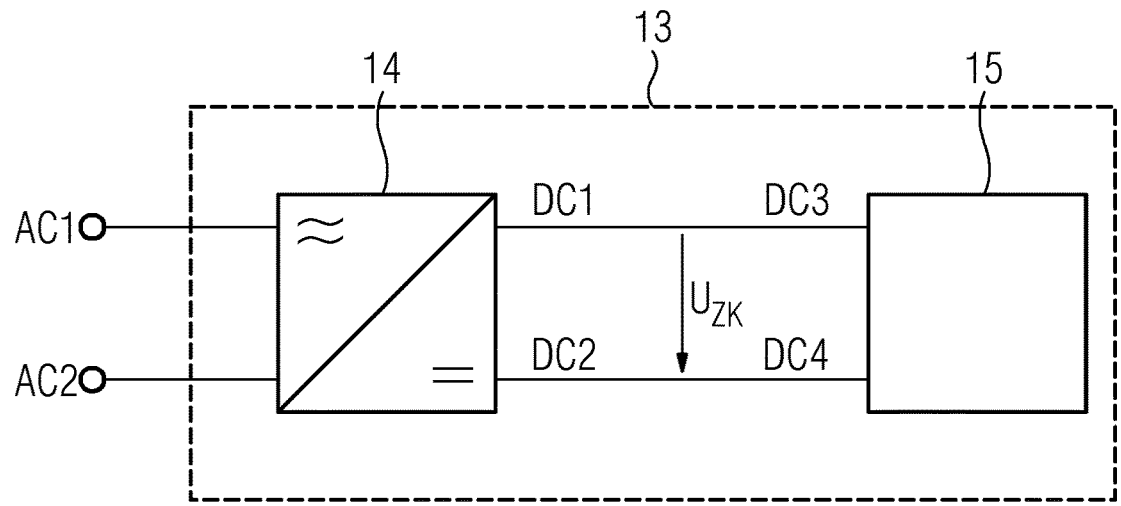

FIG. 15 shows a schematic circuit of a sub-module 13, which consists of a power module 14, to the DC link of which with the DC voltages DC1, DC2 and DC3, DC4 and thus the DC-link voltage Uzk, a capacitor module 15 is connected.

Figure 16:
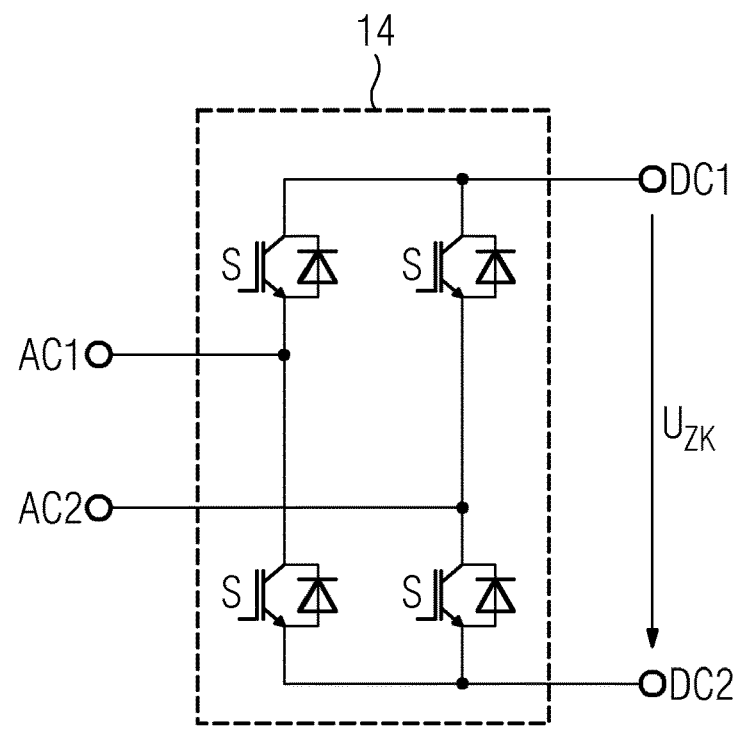

FIG. 16 shows the structure of the power module 14, which has four semiconductor switches S controlled by the control device 5, which are connected as a full-bridge. Suitable semiconductor switches S are, for example, bipolar transistors with isolated gate electrodes (IGBT).

Figure 17:
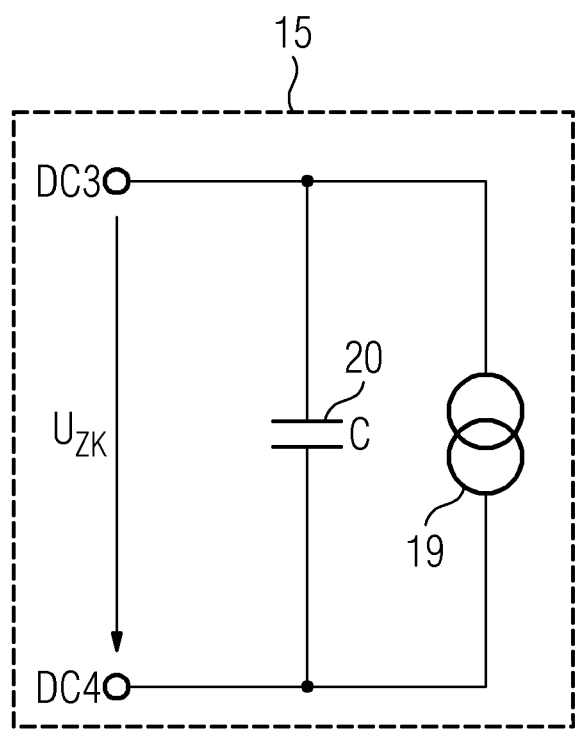

FIG. 17 shows the structure of the capacitor module 15, which consists of a capacitor voltage measurement 19 and a capacitor 20, which buffers the DC-link voltage Uzk.

The transmission device 2a, 2b, 2c, 2d, 2e thus controls, independently of the specific design, the energy transfer between several electrical energy networks, each of which has a multi-phase supply voltage at a (usually equal) network frequency for the electrical energy supply. The transmission device 2a, 2b, 2c, 2d, 2e in this case has at least two multi-phase multilevel power converters 7a, 7b, 7c, which are each connected to one of the energy networks 1a, 1b, 1c and to one another via a first multi-phase transformer 8a, 8b, 8c, and are therefore electrically isolated from each other. Via the transformer 8a, 8b, 8c, electrical energy at a specified transmission frequency, which is higher than any of the network frequencies, flows from at least one energy-supplying energy network into at least one energy-consuming energy network 1a, 1b, 1c. The control device 5 adjusts the energy transfer into the at least one energy-consuming energy network 1a, 1b, 1c according to a setpoint value, by controlling the multilevel power converters 7a, 7b, 7c accordingly, so that on the transformer side the required AC voltage AC1, AC2 is available at a transmission frequency that is higher than any of the network frequencies. Advantageously, the transmission frequency is a multiple (for example, two or three times) of the network frequency, in the case of different network frequencies of the highest network frequency. The transformer is therefore sometimes also referred to as a high-frequency transformer.

The invention claimed is:

1. A transmission device for energy transmission between a plurality of electrical energy networks each of the electrical energy networks providing a multi-phase supply voltage at a network frequency as an electrical energy supply, the transmission device comprising:
   a first multi-phase transformer;
   multi-phase multilevel power converters each connected to one of the electrical energy networks and to one another via said first multi-phase transformer and therefore electrically isolated from each other, via said multi-phase multilevel power converters and at a specified transmission frequency electrical energy flows from at least one energy-supplying energy network of the electrical energy networks into at least one energy-consuming energy network of the electrical energy networks, wherein the specified transmission frequency is greater than any said network frequency and said multi-phase multilevel power converters having three or two phase connections on a transformer side;
   a controller for adjusting a transmission of the electrical energy into at least one energy-receiving energy network of the electrical energy networks according to a setpoint value by controlling said multi-phase multilevel power converters of said electrical energy networks; and
   said first multi-phase transformer having one three-phase connection side and three two-phase connection sides, wherein on each of said two-phase connection sides one of said multi-phase multilevel power converters is connected via said two phase connections on said transformer side.

2. The transmission device according to claim 1, wherein the electrical energy networks are three-phase or two-phase and said multi-phase multilevel power converters have three or two phase connections corresponding thereto on a network side.

3. The transmission device according to claim 1,
   further comprising a second transformer;
   wherein a first of said multi-phase multilevel power converters is connected via said first multi-phase transformer to a second of said multi-phase multilevel power converters and via said second transformer to a third of said multi-phase multilevel power converters; and
   wherein said second and third multi-phase multilevel power converters are connected via said first and second transformers.

4. The transmission device according to claim 1, wherein each of said multi-phase multilevel power converters for each phase is formed of two series-connected power converter modules, wherein electrical connections between said power converter modules form network-side phase connections which are connected to the electrical energy networks.

5. The transmission device according to claim 4, wherein each of said power converter modules is formed from a plurality of series-connected sub-modules and an inductance, said series-connected sub-modules have semiconductor switches controlled by said controller and are implemented in a full-bridge circuit.

6. The transmission device according to claim 1, wherein a current through said multi-phase multilevel power converters and supply voltages of the electrical energy networks are detected and used by said controller for adjusting the electrical energy to be transmitted.

* * * * *